United States Patent [19]

Hayashi

[11] Patent Number: 5,145,935
[45] Date of Patent: * Sep. 8, 1992

[54] SHAPE MEMORY POLYURETHANE ELASTOMER MOLDED ARTICLE

[75] Inventor: Shunichi Hayashi, Takamichi, Japan

[73] Assignee: Mitsubishi Jukogyo Kabushiki Kaisha, Tokyo, Japan

[*] Notice: The portion of the term of this patent subsequent to Sep. 17, 2008 has been disclaimed.

[21] Appl. No.: 413,771

[22] Filed: Sep. 28, 1989

[30] Foreign Application Priority Data

Sep. 30, 1988 [JP] Japan .................. 63-244341

[51] Int. Cl.$^5$ .............................................. C08G 18/10
[52] U.S. Cl. .................................... 528/65; 528/66
[58] Field of Search ............................ 528/65, 66

[56] References Cited

U.S. PATENT DOCUMENTS 5,049,591 9/1991 Hayashi et al. ............... 528/59

FOREIGN PATENT DOCUMENTS 0085895 7/1978 Japan .
0028517 2/1986 Japan .
0733624 7/1955 United Kingdom .
1057018 2/1967 United Kingdom .

OTHER PUBLICATIONS

"Development of Polymeric Elasticity Memory Material", Mitsubishi Juko GIHO vol. 25, No. 3 (1988) pp. 236-240).

Primary Examiner—Maurice J. Welsh
Assistant Examiner—Rachel Johnson
Attorney, Agent, or Firm—McAulay Fisher Nissen Goldberg & Kiel

[57] ABSTRACT

A shape memory polyurethane elastomer molded article formed from a polyurethane elastomer which has a degree of crystallinity of 3~50 wt %, contains approximately equal amounts of [NCO] groups and [OH] groups at the terminals of the polymer, and is polymerized by the prepolymer method from a difunctional diisocyanate, a difunctional polyol, and a difunctional chain extender containing active hydrogen groups, which are formulated in a molar ratio of diisocyanate: polyol: chain extender=2.00~1.10: 1.00: 1.00~0.10, preferably 1.80~1.20: 1.00: 0.80~0.20. It is capable of melt molding such as injection molding, extrusion molding, and blow molding, and can be manufactured freely without being restricted by the shape of the molded article.

2 Claims, No Drawings

SHAPE MEMORY POLYURETHANE ELASTOMER MOLDED ARTICLE

FIELD OF THE INVENTION AND RELATED ART STATEMENT

The present invention relates to a shape memory polyurethane elastomer molded article having thermoplasticity.

In general, polyurethane elastomers have been used for tires by setting their glass transition point (abbreviated as Tg hereinafter) at an extremely low temperature approximate to about −40° C. so that they have low elastic moduli like ordinary natural rubber and synthetic rubbers at the low temperature time, or have been used for, for example, artificial wood etc. by setting the Tg at an extremely high temperature of about 100°~110° C. and making use of characteristic properties such as high elastic modulus and abrasion resistance even at the high temperature time.

The present inventors previously proposed a shape memory polyurethane elastomer (Japanese Patent Laid-open No. 293214/1986). The shape memory polymer molded article is something which is formed by imparting deformation at a temperature not higher than the molding temperature and above Tg, and cooling as such below the glass transition point and fixing the deformation, and which is restored to its original shape by heating at a temperature not higher than the molding temperature. That is to say, it is a polymer molded article which can use the deformed shape and the original molded shape in two ways by temperature operation.

As the above-mentioned shape memory polyurethane elastomer, two kinds of polyurethane elastomers, one in which isophorone-type isocyanate, polyol, and tolylene diisocyanate-adduct of trimethylolpropane as a chain extender are formulated and one in which 2,4-tolylene diisocyanate, polyol, and 1,4-butanediol as a chain extender, are described. All of these polyurethane elastomers are caused to possess a large amount of excess [NCO] group (isocyanate group) at the terminal so that they exhibit rubber elasticity above Tg. And, in the former formulation, crosslinking between molecules is positively carried out by using a trifunctional chain extender.

The above-mentioned polyurethane elastomer is a thermosetting polymer because the crosslinking between molecules has proceeded like this. Therefore, the molding method in the processing step had been extremely limited. To be concrete, it was extremely difficult to apply the molding method such as injection molding, extrusion molding, and blow molding.

OBJECT AND SUMMARY OF THE INVENTION

It is an object of the present invention to provide a shape memory polyurethane elastomer molded article which has thermoplasticity, retains rubber elasticity above the glass transition point in the range of room temperatures, and permits melt molding such as injection molding and extrusion molding.

The gist of the present invention resides in a shape memory polyurethane elastomer molded article formed from a polyurethane elastomer which has a degree of crystallinity of 3~50 wt %, contains approximately equal amounts of [NCO] groups and [OH] groups at the terminals of the polymer, and is polymerized by the prepolymer method from a difunctional diisocyanate, a difunctional polyol, and a difunctional chain extender containing active hydrogen groups, which are formulated in a molar ratio of diisocyanate:polyol:chain extender=2.00~1.10:1.00:1.00~0.10, preferably 1.80~1.20:1.00:0.80~0.20.

Further, the gist of the present invention resides in a shape memory polyurethane elastomer molded article having the above-mentioned gist, which is characterized in that the value of the ratio of the tensile modulus at temperatures 10° C. higher than the glass transition point to the tensile modulus at temperatures 10° C. lower than the glass transition point is 50~250.

According to the present invention, it is possible to obtain a thermoplastic shape memory polyurethane elastomer which has the shape memory function, exhibits rubber elasticity above its glass transition point, and possesses a glass transition point in the range of room temperatures. A molded article using this polyurethane elastomer becomes capable of melt molding such as injection molding, extrusion molding, and blow molding. Therefore, it becomes possible to manufacture this freely without being restricted by the shape of the molded article.

DETAILED DESCRIPTION OF PREFERRED EMBODIMENTS

The conventional shape memory polyurethane elastomer molded article, which was to exhibit rubber elasticity above the glass transition point, used to be produced by permitting the terminal of the polymer to possess a large amount of excess [NCO] so that the terminal [NCO] and the urethane link part react with each other and the crosslinking between molecules proceeds positively and the stiff allophanate link is formed. By contrast, the present invention is to use a difunctional isocyanate, polyol, and chain extender, and performs specific formulation of raw materials, does not permit the terminal of the polymer to possess excess [NCO], and imparts a prescribed degree of crystallinity. Because of this, in the present invention, it is possible to obtain a shape memory polyurethane elastomer which has a glass transition point in the range of room temperatures, for example, in the range of −50~60° C., exhibits a certain elastic modulus ratio in the vicinity of said glass transition point, and is a thermoplastic chainlike polymer.

Such a polyurethane elastomer becomes a chain polymer and a thermoplastic polymer by suppressing the crosslinking between molecules. However, since it retains partial crystal instead of suppressing the crosslinking between molecules, it becomes one which retains the rubber elasticity above the glass transition point and has the shape memory property which permits the molded article to move between the deformed shape and the molded shape in the vicinity of the glass transition point. Thus, this polyurethane elastomer becomes capable of melt molding such as injection molding and extrusion molding, because it has thermoplasticity. Therefore, according to the present invention, it became possible to form products of various shapes easily.

Meanwhile, it is desirable that the degree of crystallinity should be in the range of 3~50 wt %. If the degree of crystallinity is below 3 wt %, the rubber elasticity becomes small at temperatures higher than the glass transition point. Therefore, the shape restoration property by the shape memory effect becomes worse. On the other hand, if the degree of crystallinity is higher than 50 wt %, the rubber elasticity becomes high at temperatures above the glass transition point. Therefore, the ratio of the elastic moduli at the glass transition point ±10° C. becomes small.

The raw materials that can be used in the present invention are illustrated in the following. However, nothing is limited by this.

First, as the examples of difunctional isocyanate, it is possible to represent OCN-R-NCO by the general formula. R includes those which have 1 or 2 benzene rings or have none at all; however, any of these is usable. To be concrete, it is possible to enumerate, for example, 2,4-toluene diisocyanate, 4,4'-diphenylmethane diisocyanate, carbodiimide-modified 4,4'-diphenylmethane diisocyanate, hexamethylene diisocyanate, etc.

As the examples of the difunctional polyol, it is possible to represent OH-R'-OH by the general formula. R' includes those which have 1 or 2 benzene rings or have none at all and also products formed by reacting the above-mentioned difunctional polyol with a difunctional carboxylic acid or cyclic ether. Any of these is usable. To be concrete, it is possible to enumerate, for example, polypropylene glycol, 1,4-butane glycol adipate, polytetramethylene glycol, polyethylene glycol, bisphenol-A+propylene oxide, etc.

As the example of the difunctional chain extender containing active hydrogen groups, it is possible to represent OH-R''-OH by the general formula. R'' includes $(CH_2)_n$ group, groups having 1 or 2 benzene rings, etc. Any of these is usable. To be concrete, it is possible to enumerate, for example, ethylene glycol, 1,4-butane glycol, bis(2-hydroxyethyl)hydroquinone, bisphenol-A +ethylene oxide, bisphenol-A +propylene oxide, etc.

The synthesis of the urethane elastomer is performed by the prepolymer method using the above-mentioned isocyanate, polyol, and chain extender, and, if necessary, catalysts.

The synthesis method of the urethane elastomer by the prepolymer method is explained in the following.

First, the diisocyanate and polyol are reacted at a specific formulation ratio A=[NCO]/[OH] molar ratio to synthesize a prepolymer. After the completion of the reaction, the chain extender is added so that the desired formulation ratio B=[chain extender]/[prepolymer] molar ratio is attained, and after that, defoaming and pouring to the mold are performed, and the crosslink reaction is caused to take place at a temperature of 80° C. for 1 to 2 days in a constant temperature dryer, thereby the urethane elastomer is synthesized. The above-mentioned synthesis is possible with either a solvent system or a non-solvent system.

As the factors which affect the Tg and physical properties, (1) the kind of the isocyanate, (2) the kind of the polyol, (3) the kind of the chain extender, (4) the formulation ratio A, (5) the formulation ratio B, and (6) annealing are considered. It is possible to synthesize freely the urethane elastomer having the desired Tg and physical properties by changing these factors (1) to (6).

The polyurethane elastomer which has been synthesized from these raw materials can be represented by the general formula as follows:

HOR''OCONH(RNHCOOR'OCONH')$_n$RNH-COOR''OCONH(RNHCOOR')OCONH)$_m$RNH-COOR''OH

EXAMPLES: 1~40

An isocyanate component, a polyol component, and a chain extender were used as raw materials, and polyurethane elastomers were obtained by polymerizing them according to the prepolymer method (prepolymer process).

That is to say, the prepolymer was synthesized by formulating the isocyanate component and the polyol component as described in the following table and performing the reaction without catalyst by the above-mentioned method. Then, the polyurethane elastomer having the shape memory property was obtained by adding the chain extender according to the formulation of the following table.

The basis physical properties of this polyurethane elastomer are as shown in the following table.

TABLE 1

| Raw materials and molar formulation ratio | Molecular weight | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| Diisocyanate | | | | | | | | | | | | | | | | | | | | | |
| 2,4-toluene diisocyanate | 174 | 1.5 | | | | | | | | | | | | | | | | | | | |
| 4,4'-diphenylmethane diisocyanate | 250 | | 1.35 | | 1.5 | | | | 1.5 | 1.5 | 1.5 | 1.5 | 1.5 | 1.5 | 1.2 | 1.8 | 1.35 | 1.35 | 1.35 | 1.35 | 1.35 |
| 4,4'-diphenylmethane diisocyanate | 290 | | | | | 1.5 | 1.5 | | | | | | | | | | | | | | |
| 4,4'-diphenylmethane diisocyanate (carbodiimide-modified) | 303 | | 1.5 | 1.5 | | | | | | | | | | | | | | | | | |
| 4,4'-diphenylmethane diisocyanate (carbodiimide-modified) | | | | | | | | | | | | | | | | | | | | | |
| hexamethylene diisocyanate | 168 | | | | | | | 1.5 | | | | | | | | | | | | | |
| Polyol | | | | | | | | | | | | | | | | | | | | | |
| polypropylene glycol | 400 | | | | | | | | | | | | | | | | | | | | |
| polypropylene glycol | 700 | | | | | | | | | | | | | | | | | | | | |
| polypropylene glycol | 1000 | 0.88 | | 1.0 | | | | | | | 1.0 | 1.0 | | | 1.0 | 1.0 | 1.0 | | | | |
| 1,4-butaneglycol adipate | 600 | | | | 1.0 | | | | | | | | 1.0 | | | | | | | | |
| 1,4-butaneglycol adipate | 1000 | | | | | 1.0 | 1.0 | | | | | | | 1.0 | | | | 1.0 | | | |
| 1,4-butaneglycol adipate | 2000 | | | | | | | | | | | | | | | | | | 1.0 | 1.0 | |
| polytetramethylene glycol | 650 | | | | | | | | | | | | | | | | | | | | |
| polytetramethylene glycol | 850 | | | | | | | | | | | | | | | | | | | | 1.0 |
| polytetramethylene glycol | 1000 | | | | | | | | | | | | | | | | | | | | |
| polyethylene glycol | 600 | | | | | | | | | | | | | 1.0 | | | | | | | |
| bisphenol-A + propylene oxide | 800 | 1.0 | | | | | | | | | | | | | | | | | | | |
| Chain extender | | | | | | | | | | | | | | | | | | | | | |
| ethylene glycol | 62 | 0.51 | 0.51 | | 0.51 | 0.51 | 0.51 | | | | | | | | | | | | | | |
| 1,4-butane glycol | 90 | | | | | | | 0.51 | 0.51 | 0.51 | 0.51 | | | | | | | | | | |
| bis(2-hydroxyethyl)hydroquinone | 198 | | | | | | | | | | | 0.51 | 0.51 | | | | | | | | |
| bisphenol-A + ethylene oxide | 327 | | | | | | | | | | | | | | 0.21 | 0.81 | | | | | |
| bisphenol-A + ethylene oxide | 360 | | | | | | | | | | | | | | | | 0.36 | 0.36 | 0.36 | 0.36 | |
| bisphenol-A + propylene oxide | 360 | | | | | | | | | | | | | | | | | | | | 0.36 |
| Measured values of physical properties | | | | | | | | | | | | | | | | | | | | | |
| Tg (°C) | | 24 | −10 | 15 | −11 | 14 | 16 | −45 | 9 | 6 | 12 | 16 | −7 | −6 | −4 | 25 | 5 | −22 | 10 | −18 | −45 |
| E/E' | | 170 | 73 | 69 | 23 | 129 | 133 | 20 | 117 | 128 | 97 | 111 | 49 | 12 | 105 | 53 | 37 | 81 | 100 | 29 | 30 |
| Degree of crystallinity (wt %) | | 20 | 20 | 20 | 30 | 25 | 25 | 25 | | | | | 20 | 30 | | 20 | 25 | | | 25 | 25 |

| Raw materials and molar formulation ratio | Molecular weight | 21 | 22 | 23 | 24 | 25 | 26 | 27 | 28 | 29 | 30 | 31 | 32 | 33 | 34 | 35 | 36 | 37 | 38 | 39 | 40 |
|---|---|---|---|---|---|---|---|---|---|---|---|---|---|---|---|---|---|---|---|---|---|
| Diisocyanate | | | | | | | | | | | | | | | | | | | | | |
| 2,4-toluene diisocyanate | 174 | 1.35 | | | | | | | | | | | | | | | | | | | |
| 4,4'-diphenylmethane diisocyanate | 250 | | 1.35 | | | 1.5 | 1.35 | 1.5 | 1.4 | | 1.2 | 1.59 | 1.68 | 1.5 | 1.3 | 1.7 | 1.59 | 1.68 | | 1.5 | |
| 4,4'-diphenylmethane diisocyanate | 290 | | | 1.35 | | | | | | | | | | | | | | | | | 1.81 |
| 4,4'-diphenylmethane diisocyanate (carbodiimide-modified) | 303 | | | | 1.5 | | | | | | | | | | | | | | | | |
| 4,4'-diphenylmethane diisocyanate (carbodiimide-modified) | | | | | | | | | | | | | | | | | | | | | |
| hexamethylene diisocyanate | 168 | | | | | | | | | 1.3 | | | | | | | | | | | |
| Polyol | | | | | | | | | | | | | | | | | | | | | |
| polypropylene glycol | 400 | | | | | | | | | | | | | | | | | | | | |
| polypropylene glycol | 700 | | | | | | | | | | | | | | | | | | | | |
| polypropylene glycol | 1000 | | | | 1.0 | | | | | | | | | | 1.0 | 1.0 | 1.0 | 1.0 | | | |
| 1,4-butaneglycol adipate | 600 | | | | | 1.0 | | | | | | | | | | | | | | | |
| 1,4-butaneglycol adipate | 1000 | | | | | | 1.0 | | | | | | | | | | | | | | |
| 1,4-butaneglycol adipate | 2000 | | | | | | | | | | | | | | | | | | 1.0 | 1.0 | |
| polytetramethylene glycol | 650 | | | | | | | | | | | | | | | | | | | | 1.0 |
| polytetramethylene glycol | 850 | | | 1.0 | | | | | | | | | | | | | | | | | |

TABLE 1-continued

| | | | | | | | | | | | | | | | | | | | | | |
|---|---|---|---|---|---|---|---|---|---|---|---|---|---|---|---|---|---|---|---|---|---|
| polytetramethylene glycol | 1000 | | | | | | | | | | | | | | | | | | | 1.0 | 1.0 |
| polyethylene glycol | 600 | | 1.0 | | | | | | | | | | | | | | | | | | |
| bisphenol-A + propylene oxide | 800 | | | | | 1.0 | 1.0 | 1.0 | | | | 1.0 | | | | | | 1.0 | 1.0 | | 1.0 |
| Chain extender | | | | | | | | | | | | | | | | | | | | | | |
| ethylene glycol | 62 | | | | | | | | | | | | | 0.31 | 0.71 | 0.51 | 0.51 | | | | |
| 1,4-butane glycol | 90 | | | | | | | | | | | | | | | | | 0.51 | | | |
| bis(2-hydroxyethyl)hydroquinone | 198 | | | | | 0.51 | 0.41 | 0.31 | 0.21 | | | | | | | | | | | | 0.81 |
| bisphenol-A + ethylene oxide | 327 | 0.36 | 0.36 | 0.36 | 0.43 | 0.35 | 0.36 | | | | | | 0.51 | | | | | | | | |
| bisphenol-A + ethylene oxide | 360 | | | | | | | | | 0.51 | 0.51 | | | | | | | | | | |
| bisphenol-A + propylene oxide | 360 | | | | | | | | | | | | | | | | | | | 0.51 | |
| Measured values of physical properties | | | | | | | | | | | | | | | | | | | | | | |
| Tg (°C) | | −18 | −30 | −38 | 5 | 8 | 23 | 26 | 21 | 19 | 19 | 10 | 11 | 22 | 2 | 15 | 11 | 12 | 35 | 40 | 48 |
| E/E' | | 33 | 18 | 40 | 33 | 100 | 126 | 140 | 125 | 108 | 101 | 126 | 126 | 107 | 83 | 122 | 100 | 135 | 124 | 138 | 152 |
| Degree of crystallinity (wt %) | | 25 | 25 | | 25 | 15 | 15 | 10 | 15 | 15 | 15 | 15 | 20 | 15 | 20 | 15 | 15 | 10 | 10 | 5 | 5 |

In the table, Tg denotes the glass transition point (° C.) and E/E' denotes (tensile modulus at a temperature 10° C. lower than the glass transition point)/(tensile modulus at a temperature 10° C. higher than the glass transition point). Tg was obtained by the DSC method (differential scanning-type calorimeter). The degree of crystallinity (wt %) was measured by the X-ray diffractometry. The tensile modulus was measured according to the test method based on JIS (Japanese Industrial Standards) K7113.

Then, using the polyurethane elastomer of Example 39 (glass transition point=40° C.) in the table above, a rose flower was injection-molded in the state of open petals, a single petal having a size of 3 cm in length, 1.5 cm in width, and 3 mm in thickness, and this was attached to a stem. Then, when it was heated to about 50° C. with a dryer and the entirety was returned to room temperatures while bending the petals and keeping them in the state of bud, it was set to the shape as it was. When hot air of about 50° C. was sent to this bud with a dryer, it returned to the original open state within about 10 seconds.

According to the present invention, it is possible to obtain a thermoplastic shape memory polyurethane elastomer which has the shape memory function, exhibits the rubber elasticity above the glass transition point, and has the glass transition point in the range of room temperatures. The molded article using this polyurethane elastomer becomes capable of melt molding such as injection molding, extrusion molding, and blow molding. Therefore, it has become possible to manufacture freely this without being restricted by the shape of the molded article.

I claim:

1. A shape memory polyurethane elastomer molded article formed from a polyurethane elastomer which has a degree of crystallinity of 3~50 wt %, a glass transition point in the range of −50°~60° C., a ratio of the tensile modulus at temperatures 10° C. lower than the glass transition point to the tensile modulus at temperatures 10° C. higher than the glass transition point of 50~250, and contains approximately equal amount of [NCO] groups and [OH] groups at the terminals of the polymer, and is polymerized by the prepolymer method from a difunctional diisocyanate, a difunctional polyol, and a difunctional chain extender containing active hydrogen groups, which are formulated in a molar ratio of diisocyanate:polyol: chain extender=2.00~1.10:1.00:1.00~0.10.

2. The article of claim 1 wherein the molar ratio is 1.80~1.0:1.00:0.80~0.20.

* * * * *